(12) United States Patent
Schnabel

(10) Patent No.: US 7,358,977 B2
(45) Date of Patent: Apr. 15, 2008

(54) METHODS FOR GUTTER COMPONENT DISPLAYS

(76) Inventor: Marcus Schnabel, Feldstrasse 33, 40764 Langenfeld/Rhld. (DE)

( * ) Notice: Subject to any disclaimer, the term of this patent is extended or adjusted under 35 U.S.C. 154(b) by 491 days.

(21) Appl. No.: 10/944,749

(22) Filed: Sep. 21, 2004

(65) Prior Publication Data

US 2006/0064189 A1    Mar. 23, 2006

(51) Int. Cl.
*G09G 5/00*    (2006.01)
(52) U.S. Cl. .................................. 345/619; 705/400
(58) Field of Classification Search .......... 707/104.1; 715/501.1–502; 345/619
See application file for complete search history.

(56) References Cited

U.S. PATENT DOCUMENTS

| 5,319,541 | A | * | 6/1994 | Blanchard et al. ............ 705/29 |
| 5,526,520 | A | * | 6/1996 | Krause .................... 707/104.1 |
| 5,907,850 | A | * | 5/1999 | Krause et al. ........... 715/501.1 |
| 5,920,849 | A | * | 7/1999 | Broughton et al. ......... 705/400 |
| 6,681,527 | B2 | * | 1/2004 | Baker ............................ 52/12 |
| 6,922,701 | B1 | * | 7/2005 | Ananian et al. ......... 707/104.1 |

* cited by examiner

*Primary Examiner*—Jin-Cheng Wang
(74) *Attorney, Agent, or Firm*—Cantor Colburn LLP

(57) ABSTRACT

The present invention is in the field of gutters and methods of displaying gutter information, and, specifically, the present invention is in the field of methods of displaying gutter specifications and images to a computer user.

25 Claims, 3 Drawing Sheets

METHODS FOR GUTTER COMPONENT DISPLAYS

FIELD OF THE INVENTION

The present invention is in the field of gutters and methods of displaying gutter information, and, specifically, the present invention is in the field of methods of displaying gutter specifications and images to a computer user.

BACKGROUND

The process for designing and building a house or building is a long and complicated one. Among the many challenges involved, one of the most intensive is the process of choosing a particular part for a given application within the structure. For example, an architect working with a drawing program who wishes to add a particular detail to the drawing must often refer to disparate resources to determine what the particular desired detail looks like and what the specifications for the detail are.

The selection and incorporation of gutters, and particularly copper gutters, by an architect is made significantly more difficult by the failures described above. This difficulty is compounded by any lack of compatibility in the manner of presentation of gutters from a manufacturer and the particular software that is being used by the architect.

Accordingly, improved methods for providing seamless and integratable specification and image renderings are needed in the art.

SUMMARY OF THE INVENTION

The present invention relates to a method for displaying gutter component information. The methods enable a practitioner, for example, an architect, to simultaneously view a three dimensional rendering of the gutter component and a list and/or figures of the specifications of the component. The invention further allows the ready copying of the specifications information for use in various computer assisted drafting programs.

The present invention includes a method for visualizing a gutter component, comprising: displaying on a display device an image of said component; and, displaying on said display device specifications for said gutter component, wherein said image and said specifications are displayed simultaneously.

The present invention includes a method of providing gutter component information, comprising: providing machine code to a person who is or may be interested in said information, wherein said machine code, when executed by a computer, performs the steps of: displaying on a display device an image of said component; and, displaying on said display device specifications for said gutter component, wherein said image and said specifications are displayed simultaneously.

A program storage device readable by a machine, tangibly embodying a program of instructions executable by a machine to perform method steps to provide gutter component information, comprising the steps of: displaying on a display device an image of said component; and, displaying on said display device specifications for said gutter component, wherein said image and said specifications are displayed simultaneously.

DETAILED DESCRIPTION

The present invention relates to a method for displaying gutter component information. In various embodiments of the present invention, a method is provided that allows the simultaneous viewing of a three dimensional image and a specification type image and/or details of the specifications. This dual viewing capability allows a practitioner to both view an image of the actual gutter component and the measurements and specifications that describe that component.

Figure 1:
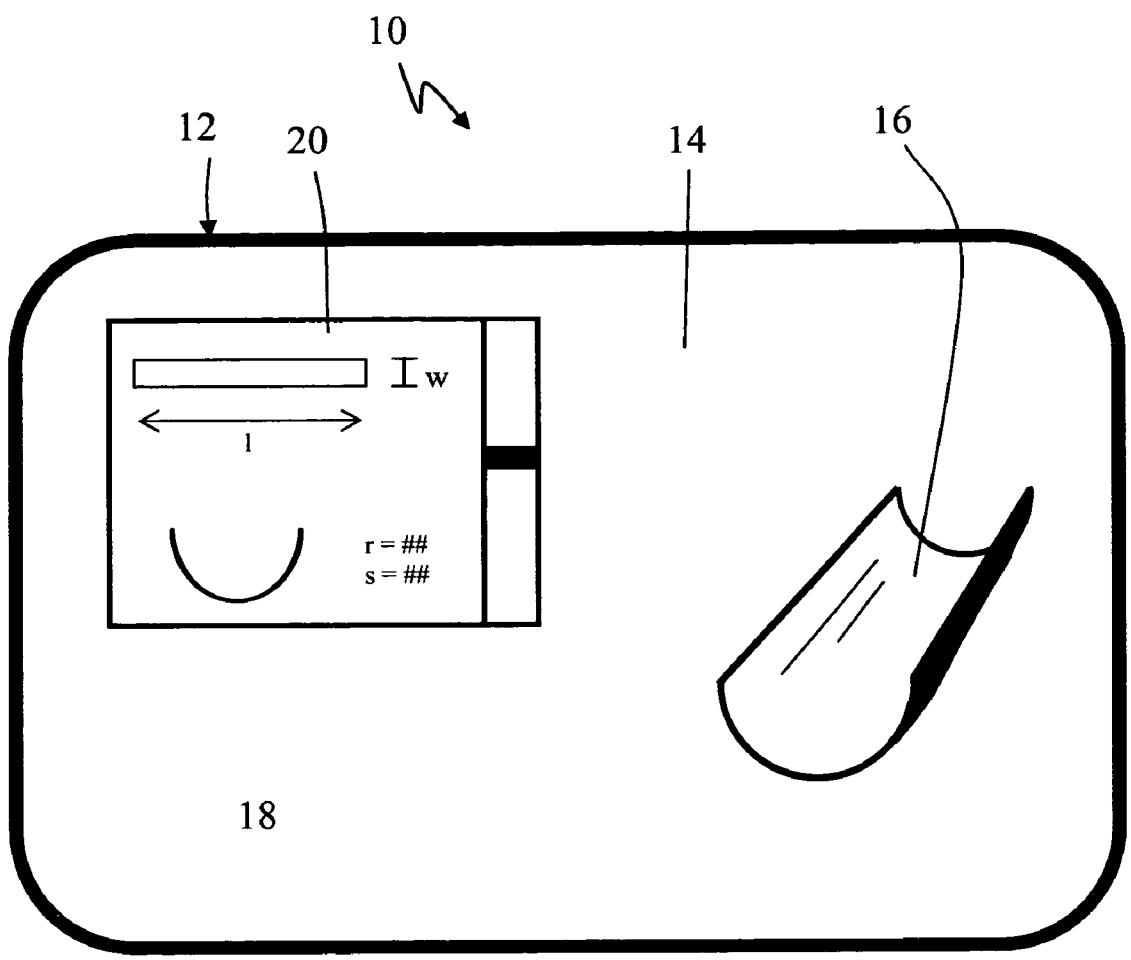
FIG. 1 represents a schematic illustration of a display on a monitor showing a visualization of one embodiment of the present invention.

As shown in FIG. 1 generally at 10, a display device 12 is used to produce an image according to the present invention. The display device 12 can be any conventional device for displaying information, for example, and not limited to, cathode ray tube monitors, plasma display panels, and liquid crystal displays, among others. In a typical embodiment, the display device 12 is a computer monitor.

The viewing area 14 of the display device in these embodiments will have a picture-type image 16 and a specifications area 20. Either the picture-type image 16, the specifications area 20, or both can have a border or lack of border, and can be arranged in any suitable manner in the viewing area. That is, the arrangement shown in FIG. 1 is exemplary, but an artisan of ordinary skill in the art will recognize that many suitable layout permutations are within the scope of the present invention.

The picture-type image 16 appears as a three dimensional image, such as offered by a perspective view, and as used herein a "picture-type" image means any image that is a reproduction or copy of a picture that is produced by a camera or any image that closely simulates such an image. A picture-type image 16, when displayed, will therefore provide a viewer with how a finished product will appear. This functionality enables a practitioner to view the finished look of a gutter component rather than just the technical specifications.

The picture-type image 16 shown in FIG. 1 in schematic form is a length of gutter, which is exemplary of a gutter component. Any gutter component can be displayed, including, for example, gutters, downspouts, end caps, supports, brackets, collectors, screens, couplers, hangers or hooks, or otherwise any component that is conventionally used in a gutter system to collect water and direct it. In various embodiments, the gutter components comprise, or consist essentially of, copper. In various embodiments, the gutter components comprise, or consist essentially of, copper, stainless steel, zinc, preweathered zinc, galvanized steel, aluminum, or a powder coated metal.

The picture-type image 16 can be a static image or it can be an image that is animated and, when viewed, appears to move in three dimensions. For example, in a simple form, movement can entail rotation about an axis at the center of the image, which allows a practitioner to view the gutter component in a complete circle. In more complex viewing forms, the gutter component can rotate about more than one axis, and can be brought closer or further from the viewer, or "zoomed" in and out. These motions can be automated, with movement occurring as soon as a particular gutter component is selected and appears on the display device, or the motions can be under the control of the viewer, using mouse, keyboard, or other similar input devices.

As also shown in FIG. 1, the viewing area 14 of the display device 12 also displays a specifications area 20 where the specifications of the gutter component are displayed. The specifications can comprise any desired set of specifications, and can include, for example, technical drawings, measurements, material composition, and virtually any other information about the gutter component that will be useful to a practitioner.

In various embodiments of the present invention, the specifications area 20 displays computer assisted drafting-type image specifications and, optionally, alphanumeric specifications. As used herein, computer assisted drafting is equivalent to computer aided drafting and CAD, and a computer assisted drafting image is defined as any image that is produced by a computer assisted drafting program, such as any version of AutoCAD® 2005 and preceding versions of AutoCAD®, such as 2000, 2002, and 2004 (available from Autodesk, Inc., San Raphael, Calif. (USA)). These images can be any suitable image, including line drawings and engineering drawings, and, as for the picture-type image, can optionally be rotatable or otherwise appear to move. Similarly, these images can be two dimensional layout type drawings, or, where desired, imaged in three dimensions. As used herein, a computer assisted drafting file means any file that contains the information for a computer assisted drafting image. As used herein, "computer assisted drafting format" means the computer assisted drafting format used in any available computer assisted drafting program. As used herein, "AutoCAD® format" means the computer aided drafting format used in any of the AutoCAD® programs available from Autodesk, Inc. at the time of filing of the present application, with the understanding that a format is not limited to a particular software version and includes future versions that use the same basic format as prior versions.

As further shown in FIG. 1, another open area 18 of the viewing area 14 can be used to display any further information that is desirable. For example, the open area 18 can be used to display navigation items, such as buttons, hyperlinked text, or hyperlinked images. In various embodiments, the open area 18 is used to display thumbnail images of gutter components. A user can select a thumbnailed gutter component image, which will cause the page with the picture-type image and specifications for that specific selected gutter component to replace the current page. Of course, as one skilled in the art will recognize, there are innumerable variations for navigation, and any suitable arrangement of the displayed items is within the scope of the present invention, including arrangements using hyperlinks, active content, linked content, and frames, among many others.

In various embodiments of the present invention, selection options are offered to allow the practitioner to perform one or more selective actions on the gutter component that is being displayed. For example, options that can be selected by the user through, for example, mouse or keyboard input, include an option that allows the printing of the specifications or of the picture-type image. Another selectable option allows the user to select the displayed gutter component as an item in a list, wherein that list can be a list that is, for example, an order list, a printable list, or a list that can be saved to file. For embodiments in which a gutter component can be selected to be placed on an order list, that list can later be printed, saved to file, or forwarded directly through a network connection or within the body of or as an attachment to an email. Such functionality allows a practitioner to review any component for appearance and specifications, and add the component to a running list that functions as an order form.

In various embodiments of the present invention, a hyperlink, button, or other navigation device is employed to allow a viewer to select as an object the computer assisted drawing that is being viewed. For example, a gutter component specification drawing can be copied directly from a program running a method of the present invention. For example, an architect who is designing a house can copy a gutter component computer assisted drafting image and paste it directly into another program that is displaying a house drawing. This functionality allows the direct incorporation of accurate drawings into suitable programs.

According to the above description, various embodiments of the present invention involve the steps of displaying on a display device an image of said component; and, displaying on said display device specifications for said gutter component, wherein said image and said specifications are displayed simultaneously.

The method steps of the present invention will generally be embodied in a machine readable code that can be read by a machine, and namely by a computer. The code, when executed, will cause to be displayed on the display device the above images. Generally, the machine readable code will be provided to a practitioner or other interested person as software, either in some tangible form, such as a diskette, compact disc, digital video disc, memory stick, flash memory device, hard drive, optically readable storage device, or magnetic storage device, or directly in the form of data through signals that are delivered through a network, which can be cabled or wireless. For example, the machine readable code can be downloaded through the Internet directly to an end-user's computer. The software is then generally installed on the computer where it can be run.

The present invention also includes methods of providing gutter component information, comprising providing machine code to a person who is or may be interested in the gutter component information, wherein the machine code provided performs the method steps for any embodiments described herein for simultaneously displaying a picture-type image and specifications for one or more gutter components. In various embodiments of the present invention, the person is an architect or is in the employment or an architect, or is otherwise receiving the machine code to pass on, directly or indirectly, to an architect.

Implementation

Figure 2:
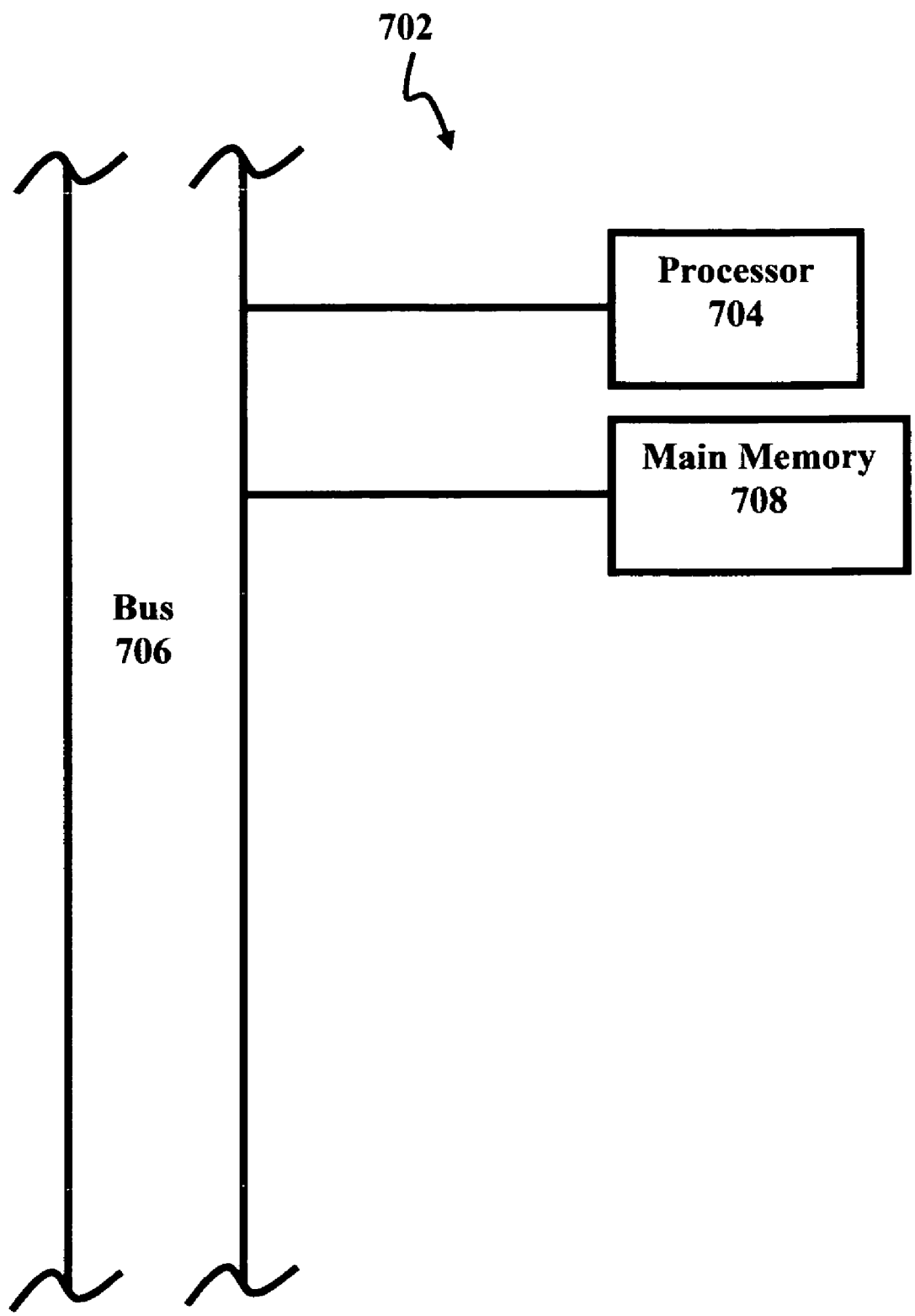
FIG. 2 represents a schematic illustration of a system capable of implementing the methods of the present invention.

A computer system capable of carrying out the functionality and methods described above is shown in more detail in FIG. 2. A computer system 702 includes one or more processors, such as a processor 704. The processor 704 is connected to a communication bus 706. The computer system 702 also includes a main memory 708, which is preferably random access memory (RAM). Various software embodiments are described in terms of this exemplary computer system. After reading this description, it will become apparent to a person skilled in the relevant art how to implement the invention using other computer systems and/or computer architectures.

Figure 3:
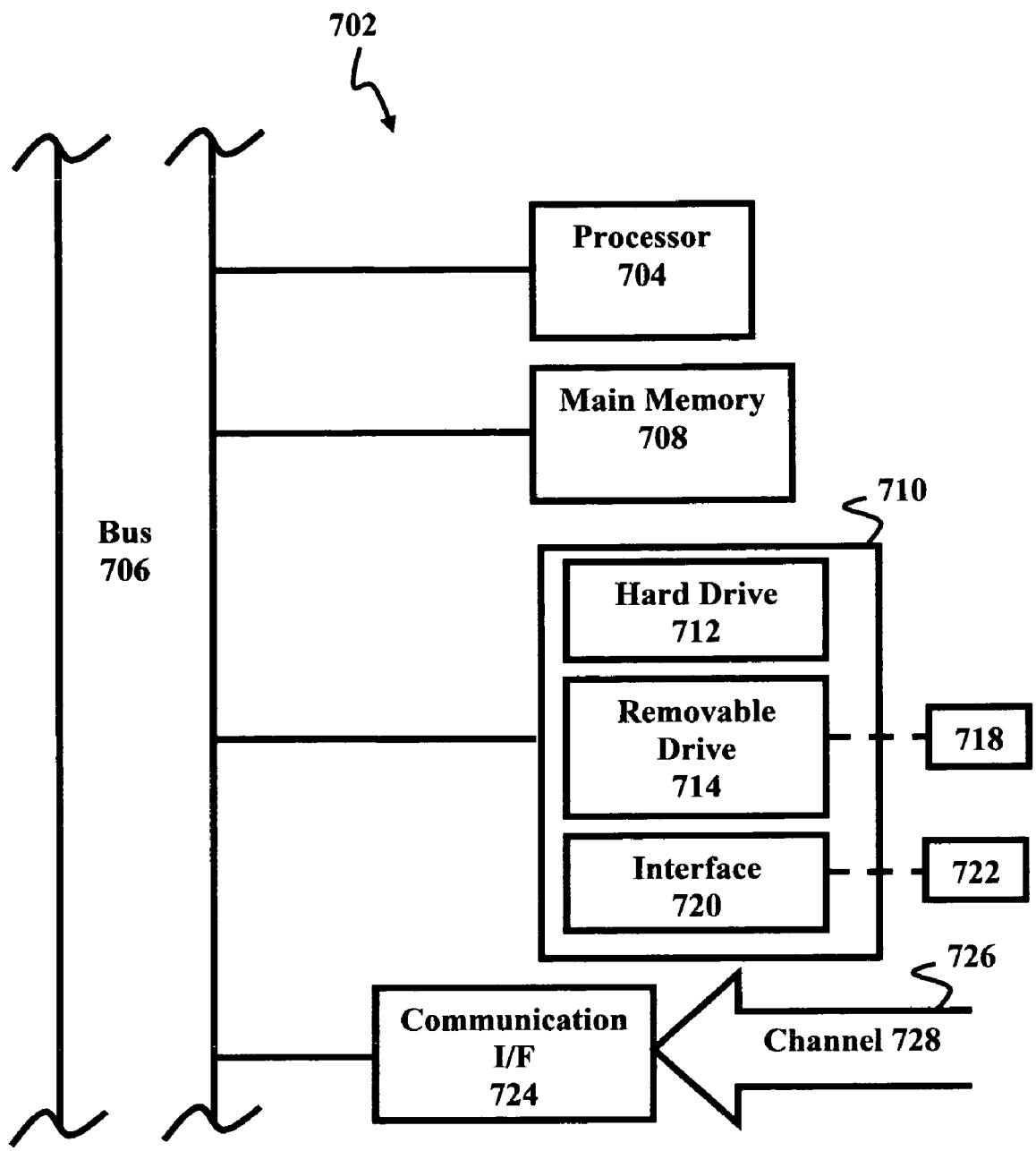
FIG. 3 represents a schematic illustration of a system capable of implementing the methods of the present invention.

In a further embodiment, shown in FIG. 3, the computer system can also include a secondary memory 710. The secondary memory 710 can include, for example, a hard disk drive 712 and/or a removable storage drive 714, representing a floppy disk drive, a magnetic tape drive, or an optical disk drive, among others. The removable storage drive 714 reads from and/or writes to a removable storage unit 718 in a well known manner. The removable storage unit 718, represents, for example, a diskette, compact disc, digital video disc, memory stick, flash memory device, hard drive, optically readable storage device, or magnetic storage device, which is read by and/or written to by the removable storage drive 714. As will be appreciated, the removable storage unit 718 includes a computer usable storage medium having stored therein computer software and/or data.

In alternative embodiments, the secondary memory 710 may include other similar means for allowing computer programs or other instructions to be loaded into the computer system. Such means can include, for example, a removable storage unit 722 and an interface 720. Examples of such can include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system.

The computer system can also include a communications interface 724. The communications interface 724 allows software and data to be transferred between the computer system and external devices. Examples of the communications interface 724 can include a modem, a network interface (such as an Ethernet card), a communications port, a PCM-CIA slot and card, etc. Software and data transferred via the communications interface 724 are in the form of signals 726 that can be electronic, electromagnetic, optical or other signals capable of being received by the communications interface 724. Signals 726 are provided to communications interface via a channel 728. A channel 728 carries signals 726 in two directions and can be implemented using wire or cable, fiber optics, a phone line, a cellular phone link, an RF link and other communications channels. In one embodiment, the channel is a connection to a network. The network can be any network known in the art, including, but not limited to, LANs, WANs, and the Internet.

In this document, the terms "computer program medium" and "computer usable medium" are used to generally refer to media such as the removable storage device 718, a hard disk installed in hard disk drive 712, and signals 726. These computer program products are means for providing software to the computer system.

Computer programs (also called computer control logic) are stored in the main memory 708 and/or the secondary memory 710. Computer programs can also be received via the communications interface 724. Such computer programs, when executed, enable the computer system to perform the features of the present invention as discussed herein. In particular, the computer programs, when executed, enable the processor 704 to perform the features of the present invention. Accordingly, such computer programs represent controllers of the computer system.

In an embodiment where the invention is implemented using software, the software may be stored in a computer program product and loaded into the computer system using the removable storage drive 714, the hard drive 712 or the communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of such a hardware state machine so as to perform the functions described herein will be apparent to persons skilled in the relevant art(s). In yet another embodiment, the invention is implemented using a combination of both hardware and software.

By virtue of the present invention, it is now possible to provide a practitioner, such as an architect, with an integrated method for simultaneously viewing a picture-type rendering and technical specification of a gutter component. These methods, as well as the systems that run them, enable a practitioner to easily view, analyze, and select a gutter component in computer assisted drafting format for use in other applications.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

It will further be understood that any of the ranges, values, or characteristics given for any single component of the present invention can be used interchangeable with any ranges, values, or characteristics given for any of the other components of the invention, where compatible, to form an embodiment having defined values for each of the components, as given herein throughout. For example, various gutter materials can be combined with any appropriate computer assisted drafting format to form many permutations that are within the scope of the present invention.

Any figure reference numbers given within the abstract or any claims are for illustrative purposes only and should not be construed to limit the claimed invention to any one particular embodiment shown in any figure.

Each reference, including journal articles, patents, applications, and books, referred to herein is hereby incorporated by reference in its entirety.

I claim:

1. A method for visualizing and representing a gutter component, comprising:
    displaying on a display device an image of said gutter component;
    displaying on said display device specifications for said gutter component, wherein said image and said specifications are displayed separate from a computer assisted drafting file;
    copying the image of only said gutter component into the computer assisted drafting file as a computer assisted drafting-type image; and,
    representing said computer assisted drafting-type image as an item of an itemized list;
    wherein,
        the item includes the specifications displayed for said gutter component; and the itemized list is in a format suitable for functioning as an order form including a running list of gutter components based on the specifications displayed.

2. The method of claim 1, wherein said display device is connected to a computer.

3. The method of claim 1, wherein said gutter component comprises copper, stainless steel, zinc, preweathered zinc, galvanized steel, aluminum, or a powder coated metal.

4. The method of claim 1, wherein said gutter component comprises copper.

5. The method of claim 1, wherein said image is a picture-type image of said component.

6. The method of claim 5, wherein said image is a moving, three dimensional image.

7. The method of claim 1, wherein said specifications are in a computer assisted drafting format.

8. The method of claim 7, wherein said computer assisted drafting format is an AutoCAD.RTM. format.

9. The method of claim 7, further comprising providing the option of electronically copying said specifications in a computer assisted drafting format.

10. The method of claim 9, wherein said specifications in a computer assisted drafting format can be pasted into the compatible computer assisted drafting file.

11. A method of providing and representing gutter component information, comprising:
providing machine code to a person who is or may be interested in said information, wherein said machine code, when executed by a computer, performs the steps of:
displaying on a display device an image of said gutter component;
displaying on said display device specifications for said gutter component, wherein said image and said specifications are displayed separate from a computer assisted drafting file;
copying the image of only said gutter component into the computer assisted drafting file as a computer assisted drafting-type image; and,
representing said computer assisted drafting-type image as an item of an itemized list;
wherein,
the item includes the specifications displayed for said gutter component; and
the itemized list is in a format suitable for functioning as an order form including a running list of gutter components based on the specifications displayed.

12. The method of claim 11, wherein said machine code is transmitted to said person over the Internet or over phone lines.

13. The method of claim 12, wherein said machine code is disposed on a program storage device.

14. The method of claim 13, wherein said program storage device is a diskette, compact disc, digital video disc, memory stick, flash memory device, hard drive, optically readable storage device, or magnetic storage device.

15. The method of claim 11, wherein said display device is connected to a computer.

16. The method of claim 11, wherein said gutter component comprises copper, stainless steel, zinc, preweathered zinc, galvanized steel, aluminum, or a powder coated metal.

17. The method of claim 11, wherein said gutter component comprises copper.

18. The method of claim 11, wherein said image is a picture-type image of said component.

19. The method of claim 18, wherein said image is a moving, three dimensional image.

20. The method of claim 11, wherein said specifications are in a computer assisted drafting format.

21. The method of claim 20, wherein said computer assisted drafting format is an AutoCAD.RTM. format.

22. The method of claim 20, further comprising providing the option of electronically copying said specifications in a computer assisted drafting format.

23. The method of claim 22, wherein said specifications in a computer assisted drafting format can be pasted into the compatible computer assisted drafting file.

24. The method of claim 11, wherein said person is an architect or in the employment of an architect.

25. A computer readable storage medium containing computer executable instructions that, when executed by a computer processor, direct the computer processor provide and represent gutter component information by:
displaying on a display device an image of said gutter component;
displaying on said display device specifications for said gutter component, wherein said image and said specifications are displayed separate from a computer assisted drafting file;
copying the image of only said gutter component into the computer assisted drafting file as a computer assisted drafting-type image; and,
representing said computer assisted drafting-type image as an item of an itemized list;
wherein
the item includes the specifications displayed for said gutter component; and
the itemized list is in a format suitable for functioning as an order form including a running list of gutter components based on the specifications displayed.

* * * * *